United States Patent [19]

Engel et al.

[11] 4,323,917

[45] Apr. 6, 1982

[54] TINT CONTROL

[75] Inventors: Christopher M. Engel, Arlington Heights; Daniel L. Reneau, Elmhurst, both of Ill.

[73] Assignee: Zenith Radio Corporation, Glenview, Ill.

[21] Appl. No.: 197,861

[22] Filed: Oct. 17, 1980

[51] Int. Cl.³ .......................................... H04N 9/535
[52] U.S. Cl. ........................................................ 358/28
[58] Field of Search ........................................... 358/28

[56] References Cited

U.S. PATENT DOCUMENTS 4,051,519  9/1977  Harwood .................... 358/28 X

OTHER PUBLICATIONS

I.E.E.E. Transactions On Consumer Electronics, vol. CE-24, No. 3, Aug. 1978.

*Primary Examiner*—Robert L. Richardson

[57] ABSTRACT

A tint control circuit is described for use in a color television receiver. The circuit generates four currents having substantially equal D.C. components, and having respective 3.58 MHz subcarrier components of four different quadrature phases. The phase of each such current is preferably variable over a range of ±45 degrees. In a preferred embodiment, the four currents are coupled to a matrixing network for developing a pair of subcarrier output voltages whose phases differ by more than 90 degrees and whose D.C. components are substantially equal. As the phases of the four currents are varied, the phases of the subcarrier output voltages vary accordingly, but maintain their phase relationship to each other.

11 Claims, 3 Drawing Figures

TINT CONTROL

BACKGROUND OF THE INVENTION

The invention is directed generally to improvements in color television receivers, and specifically to an improved tint control circuit for use in such receivers.

Conventionally, color television receivers include two or more color demodulators for demodulating the color components of a broadcast television signal. Such demodulators usually receive the color portion of the television signal and at least one color subcarrier input. The two demodulator inputs are essentially multiplied together to provide a demodulated output which varies at a function of the phase difference between the inputs. The demodulated output signal is then employed to modulate currents in a cathode ray tube to produce color images.

To vary the hue or tint of the color image, it is conventional to include a manually operable tint control knob on the receiver to permit a viewer to alter the phase of the subcarrier input to the demodulators. Typically, rotation of the knob varies a D.C. control voltage which is applied to a tint control circuit so as to vary the proportions of a pair of subcarrier currents of quadrature phases which are summed and then applied to a demodulator as a resultant subcarrier current.

Because the phase of the resultant subcarrier current varies as a function of the relative proportions of the summed currents, the hue of the demodulated color output varies accordingly.

Although such tint control circuits do perform satisfactorily in a general sense, many of them have certain drawbacks. For example, some such tint control circuits operate on or develop subcarrier signals which have rectangular type waveforms as opposed to sinusoidal waveforms. The demodulators which such tint control circuits drive are typically sensitive to the subcarrier's zero-crossing point, and the rectangular type subcarrier waveforms tend to have ambiguous zero-crossing points. Hence, the subcarrier outputs of the tint control circuit have been first filtered so as to drive the demodulators with the subcarrier's fundamental component to remove the ambiguity associated with the subcarrier's zero-crossing point. Not only does such filtering add extra expense, it also usually precludes the desired D.C. coupling between the tint control circuit and the demodulators.

A further drawback of some conventional tint control circuits is their inability to provide a pair of subcarrier outputs whose phases are separated by more than ninety degrees to render flesh tones more reproducible. In addition, the phase separation which has been provided may fluctuate undesirably as the manual tint control knob is adjusted over its entire range.

Prior tint control circuits generally include one or more of the problems mentioned above and are, therefore, less than perfectly satisfactory.

OBJECTS OF THE INVENTION

It is a general object of the invention to provide an improved tint control circuit for a color television receiver.

It is a more specific object of the invention to provide a D.C. tint control circuit which provides sinusoidal subcarrier outputs to a demodulator to preclude the need for filtering the tint control circuit's output.

It is a further object of the invention to provide such a tint control circuit which outputs subcarrier signals which are separated in phase by more than ninety degrees, which phase separation is readily reproducible from receiver-to-receiver and which remains substantially constant as the tint control knob is adjusted over its range.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
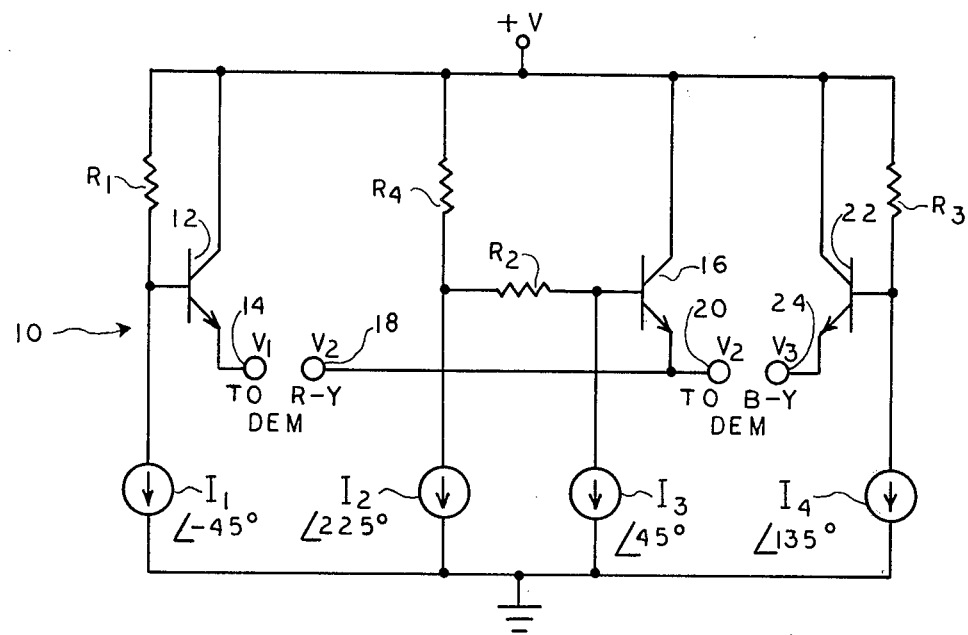
FIG. 1 illustrates a subcarrier matrixing network, according to one aspect of the invention, for generating subcarrier inputs to a pair of color demodulators.

Referring to FIG. 1, a subcarrier matrix network 10 is shown for developing subcarrier output voltages to drive a pair of color demodulators. The network includes four current sources $I_1$, $I_2$, $I_3$ and $I_4$, for supplying four currents having substantially equal D.C. components and having sinusoidal color subcarrier components (3.58 MH$_z$) of four different quadrature phases, each of the phases being variable over a selected range. For example, the current $I_1$ may have a phase angle of $-45$ degrees, the current $I_2$ may have a phase angle of 225 degrees, the current $I_3$ may have a phase angle of $+45$ degrees, and the current $I_4$ may have a phase angle of 135 degrees. All four currents may have equal amplitudes, and their phases are preferably variable so that the phases of all the currents change simultaneously over a range of $\pm 45$ degrees.

As described in more detail below, the network 10 processes the four currents to develop three sinusoidal output voltages $V_1$, $V_2$ and $V_3$ having substantially equal D.C. components. The phases and amplitudes of the output voltages are such that the angular difference between a vector corresponding to $V_1$-$V_2$ and a vector corresponding to $V_3$-$V_2$ is greater than 90 degrees. In addition, that angular difference remains substantially constant as the phases of currents $I_1$-$I_4$ are varied over their range. The voltage corresponding to $V_1$-$V_2$ may thus be applied as the subcarrier input to an R-Y demodulator, for example, and a voltage corresponding to $V_3$-$V_2$ may be applied as the subcarrier input to a B-Y demodulator.

To develop the voltage $V_1$, the current $I_1$ is coupled to a first load resistor $R_1$. The voltage $V_1$ is the voltage between the junction of the resistor $R_1$ and its current source, wherefore the voltage $V_1$ has a phase corresponding to 135 degrees when the current $I_1$ has a phase of $-45$ degrees. That voltage is coupled via a transistor 12 to an output terminal 14.

To develop the voltage $V_2$, the currents $I_2$ and $I_3$ are coupled to a load comprising resistors $R_2$ and $R_4$. As shown, the current $I_2$ is coupled directly to the resistor $R_4$ such that no component of $I_2$ flows in the resistor $R_2$. The current $I_3$ is coupled directly to the resistor $R_2$, the latter being serially coupled with the resistor $R_4$. Hence the current $I_3$ flows in resistors $R_2$ and $R_4$.

As described in more detail below, the consequence of this arrangement is that the resistors $R_2$ and $R_4$ may be selected to develop a voltage $V_2$ whose phase is in quadrature with the voltages $V_1$ and $V_3$ and whose amplitude is such that difference voltages $V_1$-$V_2$ and $V_3$-$V_2$ have the desired phase separation for driving the demodulators. In addition, the D.C. component of the voltage $V_2$ is caused to be substantially the same as the D.C. component of the voltage $V_1$. The resultant voltage $V_2$ is coupled through a transistor 16 to a first output terminal 18 and to a second output terminal 20, and has a phase angle of 225 degrees in the case where the current $I_2$ is at an angle of 225 degrees and the current $I_3$ is at an angle of +45 degrees.

The voltage $V_3$ is developed by coupling the current $I_4$ to a load resistor $R_3$. The voltage thus developed at the junction of the resistor $R_3$ and its current source may have a phase opposite to that of the voltage $V_1$ and an amplitude equal to the amplitude of the voltage $V_1$. A transistor 22 couples the voltage $V_1$ to an output terminal 24.

Figure 2:
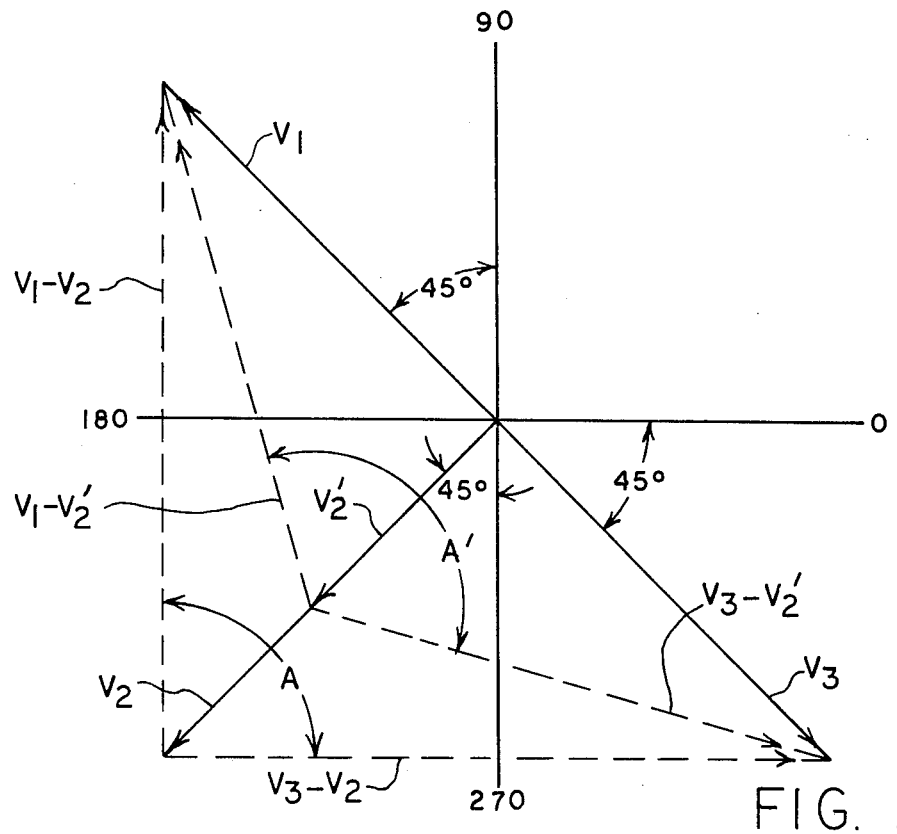
FIG. 2 is a vector diagram useful in explaining the operation of the network shown in FIG. 1.

To more fully explain the operation of the network 10, reference is made to the vector diagram shown in FIG. 2. The vectors shown therein are derived for the case in which the current $I_1$ has a phase of $-45$ degrees, the current $I_2$ has a phase of 225 degrees, the current $I_3$ has a phase of +45 degrees, the current $I_4$ has a phase of 135 degrees, and all the currents are of substantially equal amplitude. Currents of other phase angles may also be used, it being preferred, however, that the four currents have different phases which are angularly displaced from each other by multiples of 90 degrees.

For the exemplary conditions described immediately above, a vector $V_1$ corresponding to the voltage $V_1$ is at an angle of 135 degrees. A vector $V_3$ corresponding to the voltage $V_3$ is at an angle of $-45$ degrees.

To describe the effect of the illustrated arrangement of the resistors $R_2$ and $R_4$, first assume that the resistor $R_4$ is shunted so that the current $I_3$ flowing through the resistor $R_2$ provides the sole contribution to the voltage $V_2$, and assume further that the value of the resistor $R_2$ is selected to be of the same value as the resistors $R_1$ and $R_3$ to ensure that the D.C. components of the voltages $V_1$, $V_2$ and $V_3$ are equal. In that case, a vector $V_2$ corresponding to the voltage $V_2$ is equal in magnitude to the vectors $V_1$ and $V_3$ and in phase quadrature with each, the vector $V_2$ being at an angle of 225 degrees.

The illustrated relationship among the vectors $V_1$, $V_2$ and $V_3$ gives rise to a resultant vector $V_1$-$V_2$ at an angle of 90 degrees and a resultant vector $V_3$-$V_2$ at zero degrees. These resultant vectors are separated in phase by an angle A of 90 degrees, and represent two voltages available between terminals 14-18, and 24-20, respectively (for the case where the resistor $R_4$ is shunted).

When the resistor $R_4$ is in circuit as shown, the D.C. component of the current $I_2$ contributes to and raises the D.C. component of the voltage $V_2$. To counteract that effect, the value of the resistor $R_2$ is selected such that the combined D.C. voltage drops across the resistors $R_2$ and $R_4$ cause the D.C. component of the voltage $V_2$ to remain substantially equal to the D.C. components of the voltages $V_1$ and $V_3$. In other words, the D.C. voltage developed by the resistor $R_4$ is offset by lowering the value of the resistor $R_2$ such that the net D.C. voltage drop is the same as that which was developed in the case in which the resistor $R_4$ was shunted and the resistor $R_2$ was equal in value to the resistors $R_1$ and $R_3$.

The effect on the A.C. component of the voltage $V_2$ is a reduction in its amplitude without a change in its phase. This effect is accomplished because the currents $I_2$ and $I_3$ are selected to be of opposite phase, 225 degrees and +45 degrees, for example. Because equal amplitudes of $I_2$ and $I_3$ flow through the resistor $R_4$, their A.C. components cancel so that substantially no A.C. component is present at the junction between $R_2$ and $R_4$. Hence, the phase of the A.C. component of the voltage $V_2$ continues to be determined by the current $I_3$.

Referring to FIG. 2 again, a vector $V'_2$ is shown which corresponds to a voltage $V'_2$ developed at terminal 20 when the effects of the resistor $R_4$ and a smaller resistor $R_2$ are accounted for. Because the length of the vector $V_2$ is shortened to $V'_2$ the two new vectors $V_1$-$V'_2$ and $V_3$-$V'_2$ are now separated by an angle $A'$ of approximately 100 degrees. Voltages corresponding to the latter vectors are generated between the matrixing network's output terminals 14-18 and 24-20 for application to a pair of color demodulators. The larger angular spread thus obtained in the vectors associated with the output voltages causes the demodulators to develop flesh tone signals of a more consistent hue.

As stated above, the phases of currents $I_1$ through $I_4$ are preferably variable over a range of $\pm 45$ degrees. When such phase variation occurs, as in response to adjustment of a manual tint control knob, the vectors $V_1$-$V'_2$ and $V_3$-$V'_2$ (FIG. 2) rotate clockwise and counter-clockwise by 45 degrees, all the while retaining their angular relationship to each other.

The matrixing network can be seen to provide a very reproduceable phase relationship between the subcarrier voltages developed for the demodulators. That relationship is controlled primarily by the relative values of the resistors $R_1$ through $R_4$. And because such relative values may be closely controlled when the network is fabricated as a part of an integrated circuit, the network's output voltages are highly predictable.

As stated earlier, the illustrated matrixing of the currents $I_2$ and $I_3$ also permits the network's output voltages to contain substantially equal D.C. components, thereby to facilitate the D.C. coupling between the matrixing network and the demodulators. Toward this end, the currents $I_1$ through $I_4$ are preferably selected to have substantially equal D.C. components, and the resistors $R_1$ and $R_3$ are selected to be of substantially the same value. Thus, the D.C. components of the voltages $V_1$ and $V_3$ will clearly be of substantially equal value.

To provide the voltage at terminal 20 with the desired D.C. component, the resistor $R_2$ may have a value of $K_1R$ and the resistor $R_4$ may have a value of $K_2R$, where R is the value of resistors $R_1$ and $R_3$, and $K_1$ and $K_2$ are proportioning factors selected such that $K_1+2K_2=1$. Satisfaction of this equation provides output voltages $V_1$, $V_2$ and $V_3$ which have substantially equal D.C. components. For this reason, it becomes practical to D.C. couple the network's output voltages to the subcarrier inputs of demodulators.

Figure 3:
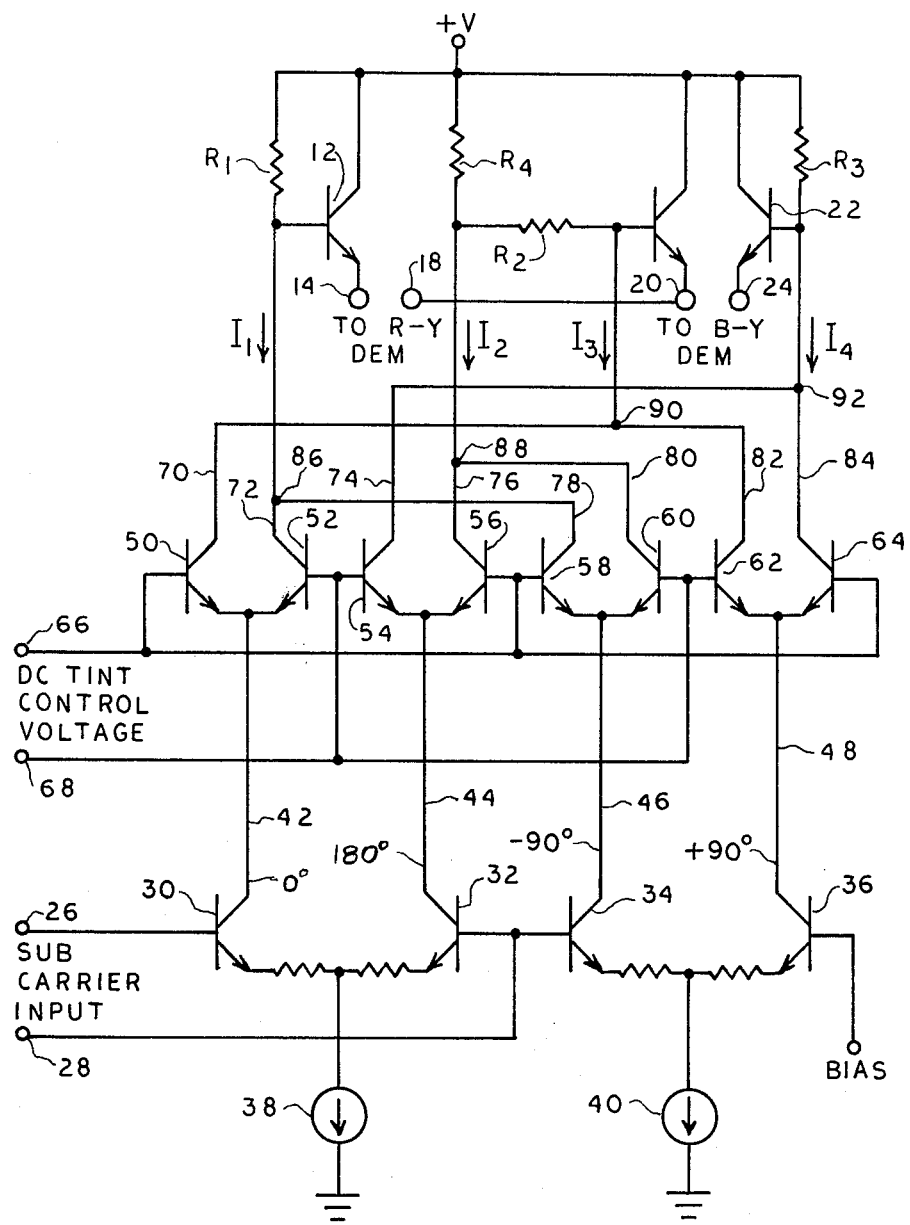
FIG. 3 is a detailed circuit diagram of a tint control circuit employing the network of FIG. 1.

Referring now to FIG. 3, a tint control circuit is shown for generating the currents identified as $I_1$ through $I_4$ in FIG. 1, and for applying those currents to the current matrixing network. The latter network is shown as a part of the over-all tint control circuit of FIG. 3.

The tint control circuit includes input terminals 26 and 28 for receiving a pair of sinusoidal subcarrier inputs of different phases. The subcarrier inputs are coupled as shown to the bases of a first differential amplifier comprising transistors 30 and 32, and to a second differential amplifier comprising transistors 34 and 36. The differential amplifiers receive D.C. operating currents of equal magnitude from current sources 38 and 40. With the bases of the transistors coupled to the input terminals as shown, the subcarrier input voltages may be selected such that the transistors 30-36 develop at their respective collector leads four intermediate sinusoidal currents of substantially equal amplitude but of four different, non-varying, quadrature phases. For example, if the subcarrier input at terminal 26 has a phase angle of −45 degrees, if the subcarrier input at terminal 28 has a phase of −90 degrees and if the magnitude of the input at terminal 26 is greater than the magnitude of the input at terminal 28 by a factor equal to the square root of two, the transistor 30 develops an intermediate current in its collector lead 42 which is at an angle of 0°; the transistor 32 develops an intermediate current in its collector lead 44 which is at an angle of 180°; the transistor 34 develops an intermediate current in its collector lead 46 which is at an angle of −90 degrees; and the transistor 36 develops an intermediate current in its collector lead 48 which is at an angle of +90 degrees.

Coupled to the collector leads 42, 44, 46 and 48 are four additional differential amplifiers comprising transistors 50-64. The emitter terminals of each differential amplifier are coupled as shown to receive one of the intermediate currents via leads 42-48.

The bases of transistors 50-64 receive a variable D.C. tint control voltage from terminals 66 and 68 in a manner such that one side of each differential amplifier is coupled to the terminal 66 and the other side is coupled to the terminal 68. Specifically, the terminal 66 is coupled to the bases of transistors 50, 56, 58 and 64, whereas the terminal 68 is coupled to the bases of transistors 52, 54, 60 and 62. With this arrangement, each side of each differential amplifier conducts equally when the voltage at terminal 66 is zero relative to the voltage at terminal 68. In this condition, the differential amplifiers are referred to herein as being "balanced".

When such a balanced condition exists, the collector leads 70 and 72 of transistors 50 and 52 each carry a current equal to one-half the current in lead 42 at an angle of 0°. Thus, the intermediate current in the lead 42 has been split into a pair of further currents in leads 70 and 72.

In a similar manner, the transistors 54 and 56 split the intermediate current in lead 44 into a pair of further currents of equal amplitude and having a phase angle of 180° in collector leads 74 and 76.

The transistors 58, 60, 62 and 64 also split their received currents into pairs of further currents such that the collector leads 78 and 80 carry currents of equal amplitude at an angle of −90 degrees, and the collector leads 82 and 84 carry currents of equal amplitude at an angle of +90 degrees.

The further currents thus developed in collector leads 70-84 are, of course, of equal amplitude when the differential amplifiers are balanced. However, when the voltage at terminal 66 exceeds the voltage at terminal 68 by at least several hundred millivolts, the transistors 50, 56, 58 and 64 will be full on and the transistors 52, 54, 60 and 62 will be full off. Consequently, the current in the lead 70 will be equal in amplitude to the intermediate current in the lead 42. Likewise, the collector leads 76, 78 and 84 will carry currents equal, respectively, to the currents in leads 44, 46 and 48.

When the voltage at terminal 68 exceeds the voltage at terminal 66, the transistors 52, 54, 60 and 62 will be full on and transistors 50, 56, 58 and 64 will be full off. Consequently, the collector leads 72, 74, 80 and 82 carry currents equal, respectively, to the intermediate currents in leads 42, 44, 46 and 48.

It will be seen, therefore, that the relative amplitude of the further currents in any pair of collector leads, such as 70 and 72, varies in accordance with the D.C. tint control voltage. In a balanced condition, the further currents in leads 70 and 72 are equal to one-half the current in lead 42. When the voltage at terminal 66 exceeds the voltage at terminal 68, the amplitude of the further current in collector lead 70 exceeds the amplitude of current in lead 72. The opposite condition occurs when the voltage at terminal 68 exceeds the voltage at terminal 66. The other pairs of collector leads 74-76, 78-80 and 82-84 carry currents whose amplitudes vary in a similar manner.

To develop the currents $I_1$, $I_2$, $I_3$ and $I_4$ for the matrixing network, selected pairs of further currents are summed by coupling together selected pairs of collector leads. For example, collector leads 72 and 78 are coupled together at a node 86. The node 86 is coupled to the resistor $R_1$ so that, at balance, a current $I_1$ having an angle of −45° flows toward the node 86. This phase angle for the current $I_1$ results from the fact that the phase of the current in the lead 72 is at an angle of zero degrees, and the phase of the current in the lead 78 is at an angle of −90 degrees. Because these latter currents have an equal amplitude, the resultant current $I_1$ has an angle of −45 degrees.

To develop the current $I_2$, the currents in collector leads 76 and 80 are summed at a node 88. The node 88 is coupled to the junction of resistors $R_2$ and $R_4$ so that, at balance, a current $I_2$ at an angle of 225 degrees flows toward the node 88. The latter phase angle results from the fact that the currents summed at node 88 have respective phase angles of 180 degrees and −90 degrees. Because both such currents have the same amplitude, the resultant current $I_2$ has a phase angle of 225 degrees.

The current in leads 70 (at an angle of zero degrees) and the current in lead 82 (at an angle of +90 degrees) are summed at a node 90 which is coupled to the resistor $R_2$. The resultant current $I_3$ which flows toward the node 92 has a phase angle of +45 degrees at balance.

The current in leads 74 (at an angle of 180 degrees) and the current in lead 84 (at an angle of +90 degrees) are summed at another node 92 which is coupled to the resistor $R_3$. The resultant current $I_4$ which flows toward the node 92 has a phase angle of 135 degrees at balance.

As described above, the matrixing network operates on the currents $I_1$-$I_4$ so as to develop between terminals 14-18 and 24-20 subcarrier output voltages which are separated in phase by more than 90 degrees, and preferably by about 100 degrees.

In addition, because the currents $I_1$-$I_4$ have substantially equal D.C. components which are derived from the current sources 38 and 40, and because of the matrixing effected with respect to the currents $I_2$ and $I_3$, the matrixing network's output voltages have substantially equal D.C. components.

When the tint control voltage is varied, the D.C. components of the currents $I_1$-$I_4$ remain substantially constant. However, the phase angles associated with their subcarrier components vary by ±45 degrees to effect a corresponding variation in the phases of the subcarrier output voltages. For example, when the tint control voltage is varied such that the voltage at terminal 66 exceeds the voltage at terminal 68 by at least several hundred millivolts, the current $I_1$ consists only of the current in lead 78, which current has a phase of −90 degrees. Thus the current $I_1$ is varied in phase from −45 degrees at balance of −90 degrees. When the voltage at terminal 68 exceeds the voltage at terminal 66 by at least several hundred millivolts, the current $I_1$ consists only of the current in lead 72 which is at an angle of zero degrees. Hence, the phase of the current $I_1$ is variable ±45 degrees about its balanced value of −45 degrees.

The currents which are summed to develop currents $I_2$-$I_4$ are varied ±45 degrees in a similar manner so that the current $I_2$ may be varied between 180 degrees and −90 degrees, the current $I_3$ may be varied between zero degrees and +90 degrees, and the current $I_4$ may be varied between 180 degrees and +90 degrees. Such variation in the currents $I_1$-$I_4$ results in a ±45 degree rotation in the vectors $V_1$-$V'_2$ and $V_3$-$V'_2$ in FIG. 2.

Because the tint control circuit receives sinusoidal subcarrier inputs at terminals 26 and 28, and because those inputs are processed in a substantially linear fashion, the voltages at the matrixing network's output terminals are also sinusoidal. Hence, no filtering of those output voltages is required prior to their application to demodulators. This advantage, along with the fact that the matrixing network's output voltages have substantially equal D.C. components, makes it possible to D.C. couple the tint control to the demodulators.

Although the invention has been described in terms of a preferred structure, it will be obvious to those skilled in the art, that many modifications and alterations may be made to suit a particular application of the invention. Accordingly, all such modifications and alterations are intended to be included within the spirit and scope of the invention as defined by the appended claims.

What is claimed is:

1. A tint control for use in a color television receiver, comprising:
    means for generating first, second, third and fourth currents having substantially equal D.C. components and having respective color subcarrier A.C. components of four different quadrature phases, which phases are each variable over a selected range; and
    means for coupling said currents to loads to develop three voltages, $V_1$, $V_2$ and $V_3$ having substantially equal D.C. components, having phases and amplitudes such that the angular difference between a vector corresponding to $V_1$-$V_2$ and a vector corresponding to $V_3$-$V_2$ is greater than 90 degrees, and such that said angular difference remains substantially constant as the phases of the A.C. components of said four currents are varied over the selected range,
    whereby voltages corresponding to $V_1$-$V_2$ and $V_3$-$V_2$ are adapted to be D.C. coupled to a pair of color demodulators for demodulating color signals at a relative angle other than 90 degrees.

2. A tint control as set forth in claim 1 wherein said coupling means includes:
    means for coupling said first current to a first load to develop the voltage $V_1$;
    means for coupling said second and third currents to a second load to develop the voltage $V_2$ such that the voltage $V_2$ is in phase quadrature with the voltage $V_1$; and
    means for coupling said fourth current to another load to develop the voltage $V_3$ such that the phase of the voltage $V_3$ is opposite the phase associated with the voltage $V_1$.

3. A tint control as set forth in claim 2 wherein said first and fourth currents and their respective loads are selected such that the voltages $V_1$ and $V_3$ are of substantially equal amplitude.

4. A tint control as set forth in claim 3 wherein the second and third currents and their load is selected such that the A.C. component of the voltage $V_2$ is smaller than corresponding components of the voltages $V_1$ and $V_3$.

5. A tint control as set forth in claim 1 wherein said current generating means is adapted to receive a pair of sinusoidal subcarrier inputs of different selected phases for developing four intermediate sinusoidal currents of substantially equal amplitude but of four different, non-varying, quadrature phases,
    and including means for splitting each of said intermediate currents into a pair of further currents whose relative amplitude is variable in response to a variable D.C. tint control voltage, and for summing selected pairs of said further currents to provide said first, second, third, and fourth currents.

6. A tint control as set forth in claim 5 wherein said current splitting means includes four differential amplifiers, each such amplifier receiving as a source one of said intermediate currents, and each such amplifier having a pair of outputs for providing said further currents, and responsive to the D.C. tint control voltage for steering variable portions of its source current to its output, and wherein selected pairs of outputs of the amplifiers are coupled together to provide four current outputs corresponding to said first, second, third and fourth currents.

7. A tint control for use in a color television receiver, comprising:
    means for receiving a pair of sinusoidal color subcarrier inputs of different selected phases for developing four intermediate sinusoidal currents of substantially equal amplitude but of four different, non-varying, quadrature phases;
    means for splitting each of said intermediate currents into a pair of further currents whose relative amplitude is variable in response to a variable D.C. tint control voltage, and for summing selected pairs of said further currents so as to provide first, second, third and fourth currents having substantially equal D.C. components and having respective color subcarrier A.C. components of four different quadrature phases, which phases are each variable over a selected range in response to variations in the tint control voltage;
    means for coupling said first current to a first load to develop a voltage $V_1$;
    means for coupling said second and third currents to a second load to develop a voltage $V_2$ such that the subcarrier component of the voltage $V_2$ is smaller than and in phase quadrature with the subcarrier component of the voltage $V_1$; and
    means for coupling said fourth current to another load to develop a voltage $V_3$ such that the subcarrier component of the voltage $V_3$ is of substantially equal amplitude and of opposite phase to the subcarrier component of the voltage $V_1$;

whereby voltages corresponding to $V_1$-$V_2$ and $V_3$-$V_2$ are adapted to be coupled to a pair of color demodulators for demodulating color signals at a relative angle greater than ninety degrees.

8. A tint control as set forth in claim 7 wherein said first, second, third and fourth currents are derived such that the voltages $V_1$, $V_2$ and $V_3$ have substantially equal D.C. components.

9. A tint control as set forth in claim 7 wherein said first, second, third and fourth currents are derived and coupled to their loads such that the angular difference between a vector corresponding to $V_1$-$V_2$ and a vector corresponding to $V_3$-$V_2$ is greater than ninety degrees, and such that said angular difference remains substantially constant as the tint control voltage is varied.

10. A tint control as set forth in claim 9 wherein said current splitting means includes four differential amplifiers, each such amplifier receiving as a source one of said intermediate currents, and each such amplifier having a pair of outputs for providing said further currents, and responsive to the D.C. tint control voltage for steering variable portions of its source current to its output, and wherein selected pairs of outputs of the amplifiers are coupled together to provide four current outputs corresponding to said first, second, third and fourth currents.

11. A tint control for use in a color television receiver, comprising:
  a pair of differential amplifiers receiving sinusoidal chroma subcarrier signals of selected phases and amplitudes for developing four intermediate collector currents of different quadrature phases;
  a current steering circuit receiving said four collector currents and receiving a D.C. tint control voltage for splitting each of said four collector currents between two current paths, the relative amount of collector current in each path being a function of the tint control voltage;
  means for summing currents in selected pairs of current paths which carry currents whose phases differ by 90 degrees to provide four summed currents whose phases are variable by the tint control voltage over a range of approximately 90 degrees;
  means for coupling a first of said summed currents to a load resistor to develop a first voltage $V_1$
  means for coupling a second of said summed currents to a second load resistor;
  means for coupling a third of said summed currents to a third load resistor serially coupled to said second load resistor such that said third summed current flows through said second and third load resistors and said second summed current flows substantially only through said second load resistor so as to develop across said second and third load resistors a voltage $V_2$;
  means for coupling a fourth of said summed currents to a fourth load resistor so as to develop a voltage $V_3$ which is opposite in phase to the voltage $V_1$;
  said second and third summed currents being selected such that the voltage $V_2$ is in phase quadrature with the voltages $V_1$ and $V_3$, and such that the voltage $V_2$ has an amplitude which is smaller than the amplitudes of $V_1$ and $V_3$ so that the angular difference between a vector corresponding $V_1$-$V_2$ and a vector corresponding to $V_3$-$V_2$ is approximately 100 degrees,
  whereby linear sinusoidal voltages corresponding to $V_1$-$V_2$ and $V_3$-$V_2$ are adapted to be coupled to a pair of color demodulators for demodulating color signals at a relative angle of approximately 100 degrees.

* * * * *